United States Patent
Jöllerichs et al.

(10) Patent No.: US 8,140,237 B2
(45) Date of Patent: Mar. 20, 2012

(54) METHOD AND SYSTEM FOR DETERMINING A BRAKE PRESSURE PREDEFINED BY A VEHICLE CONTROL SYSTEM

(75) Inventors: Rainer Jöllerichs, Oldenburg (DE); Thomas Lenz, Lehrte (DE)

(73) Assignee: WABCO GmbH, Hannover (DE)

( * ) Notice: Subject to any disclaimer, the term of this patent is extended or adjusted under 35 U.S.C. 154(b) by 424 days.

(21) Appl. No.: 12/386,777

(22) Filed: Apr. 22, 2009

(65) Prior Publication Data

US 2009/0276132 A1 Nov. 5, 2009

(30) Foreign Application Priority Data

Apr. 30, 2008 (DE) .................. 10 2008 021 845
Sep. 24, 2008 (DE) .................. 10 2008 048 763

(51) Int. Cl.
*B60T 7/12* (2006.01)
(52) U.S. Cl. .................. 701/78; 73/39
(58) Field of Classification Search .......... 701/78; 73/39

See application file for complete search history.

(56) References Cited

U.S. PATENT DOCUMENTS

| | | | | |
|---|---|---|---|---|
| 4,647,115 A * | 3/1987 | Leiber et al. | ................. | 303/146 |
| 5,511,863 A * | 4/1996 | Suh | ................. | 303/113.4 |
| 6,604,042 B2 * | 8/2003 | Maruko et al. | ................. | 701/96 |
| 2003/0137190 A1 * | 7/2003 | Burkhard et al. | ................. | 303/11 |
| 2005/0269874 A1 * | 12/2005 | Ishimoto | ................. | 303/146 |
| 2009/0005946 A1 * | 1/2009 | Futamura et al. | ................. | 701/70 |

* cited by examiner

*Primary Examiner* — Paul N Dickson
*Assistant Examiner* — Nicole Verley
(74) *Attorney, Agent, or Firm* — Kramer Levin Naftalis & Frankel LLP

(57) ABSTRACT

A method and system for determining a brake pressure which is predefined by a vehicle control system involve effecting a vehicle braking process initiated by an electronic braking system and/or the vehicle driver, determining a vehicle deceleration a, and a brake pressure $p_{estim}$, comparing the brake pressure $p_{estim}$ against a reference pressure $p_B$, terminating the braking process triggered by the electronic braking system when $p_{estim}$ is less than the reference pressure $p_B$, or continuing the braking process triggered by the electronic braking system when $p_{estim}$ is greater than or equal to the reference pressure $p_B$.

16 Claims, 2 Drawing Sheets

METHOD AND SYSTEM FOR DETERMINING A BRAKE PRESSURE PREDEFINED BY A VEHICLE CONTROL SYSTEM

FIELD OF THE INVENTION

The present invention generally relates to a method and system for determining a brake pressure that is predefined by a vehicle braking control system. The present invention has application in vehicles having conventional manual braking systems and electronically controlled braking systems such as, for example, roll stability control systems (RCS) or adaptive cruise control (ACC) systems.

BACKGROUND OF THE INVENTION

In vehicles operating with both conventional manual and electronically controlled braking systems, predefined deceleration values, which are compensated for by control elements, are implemented during an RSC or ACC control intervention by control electronics. In this connection, for example, electrically switched 3/2 way valves are used to build pressure in the vehicle brake cylinders, which pressure can be maintained by closing anti-lock braking system (ABS) valves after a desired pressure level has been reached.

During vehicle operation, the vehicle driver regularly issues braking instructions via the foot-operated brake pedal while the control electronics are currently active. If the braking demand by the vehicle driver is greater than that predefined by the control electronics, it is necessary to terminate the control process so that the brake pressure requested by the driver can be fed to the braking arrangement. For this to function reliably, it is necessary to determine as precisely as possible when the brake pressure requested by the driver is greater than the pressure that is predefined by the control system. For this purpose, conventional braking systems use two pressure sensors, one of which measures the pressure in a pressure line actuated by the driver, while the other measures the pressure in the line which is actuated by the control electronics. Some conventional systems operate by estimating the brake pressure of the control electronics based on measurement of the activation times of the ABS valves.

These conventional systems are subject to certain disadvantages—namely, the use of the two pressure sensors increases costs, and when activation times are estimated as described above they are not precise enough. In particular, systems which estimate the brake pressure as described above are not suitable for ACC systems owing to the lack of precision.

SUMMARY OF THE INVENTION

The present invention overcomes disadvantages associated with conventional vehicle braking systems and provides embodiments of a method for determining, and a braking system adapted to determine, a brake pressure that is predefined by a braking control system, so as to determine with precision when the brake pressure requested by the driver is greater than and should override the pressure that is predefined by the control system.

The method according to a preferred embodiment of the present invention includes the steps of: effecting vehicle braking by the electronic braking system and/or the vehicle driver; determining the vehicle deceleration a; determining the estimated brake pressure that is predefined by the control electronics $p_{estim}$; comparing the brake pressure $p_{estim}$ against a reference pressure $p_B$; and terminating vehicle braking triggered by the electronic braking system when $p_{estim}$ is less than the reference pressure $p_B$, or continuing vehicle braking triggered by the electronic braking system when $p_{estim}$ is greater than or equal to the reference pressure $p_B$.

According to an advantageous embodiment of the present invention, the inventive method also includes the steps of: calculating a characteristic variable K (where K is the quotient of brake pressure $p_B$ and vehicle deceleration a); and calculating the brake pressure $p_{estim}$ as the product of the characteristic variable K and vehicle deceleration a (i.e., Ka).

A further embodiment of the method according to the present invention includes the step of effecting a learning process by means of a data processing system to determine the characteristic variable $K_{Ref}$. The learning process serves the purpose of preventing adverse effects owing to individual "atypical" measured values which could cause an incorrect characteristic variable $K_{Ref}$ to be determined. The learning process can include the steps of: effecting vehicle braking; determining the characteristic variable K; transferring the characteristic variable K to the data processing system; and forming average values over a plurality of values of K to yield the average characteristic variable $K_{Ref}$.

In a further embodiment of the method according to the present invention $p_{estim}$ is calculated as the product of $K_{Ref}$ and a.

The vehicle braking system according to embodiments of the present invention employs a data processing system to determine brake pressure $p_{estim}$. The braking system encompasses an integrated system for determining brake pressure predefined by the control system, as well as a braking arrangement designed to brake at least one vehicle wheel, at least one pressure line for making available pressurized fluid for the braking arrangement, measuring means for determining the brake pressure which is present in the braking arrangement, measuring means for determining the wheel speed and/or the vehicle deceleration, the data processing system for processing the brake pressure which is predefined by control electronics, and memory designed to store and read out data.

In one embodiment of the braking system according to the present invention, the data processing system is integrated into a control unit which is configured to control automatic braking processes. This control unit is advantageously designed to obtain and process various measurement signals which are sensed and transferred by a plurality of sensors over the entire vehicle. This control unit typically controls a series of driver assistance systems and monitors the operation of these systems and other vehicle components. By integrating the data processing system into the control unit, the data processing system can be supplied with measurement signals by means of the control unit, and, conversely, the brake pressure signals which are made available by the data processing system can be transferred to the control unit. As a result, the braking system is configured to make available the brake pressure signals to a wide variety of driver assistance systems, for example RSC or ACC systems, or to terminate braking triggered by the electronic braking system.

According to another embodiment of the braking system of the present invention, the data processing system is designed to store values for the characteristic variable K or characteristic variable $K_{Ref}$ in data memory and/or to read out values of the characteristic variable K or $K_{Ref}$ from the data memory. It should be understood that any suitable known physical data carriers can be used as data memories in this context. However, it is particularly advantageous to use data memories that are resistant to shock. Also, depending on the installation situation, it is desirable to accommodate for extreme temperature differences; accordingly, it is advantageous for the data memory to be protected against particularly high and/or low temperatures.

The present invention also relates to a vehicle, in particular, a truck, equipped with a braking system according to embodiments of the present invention.

Also, the present invention relates to a computer program product comprising a computer usable physical medium storing a computer readable program code for causing an application program to execute on a computer to cause a braking system according to embodiments of the present invention to effect process steps according to embodiments of the present invention to determine a brake pressure which is predefined by a control system.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

Figure 1:
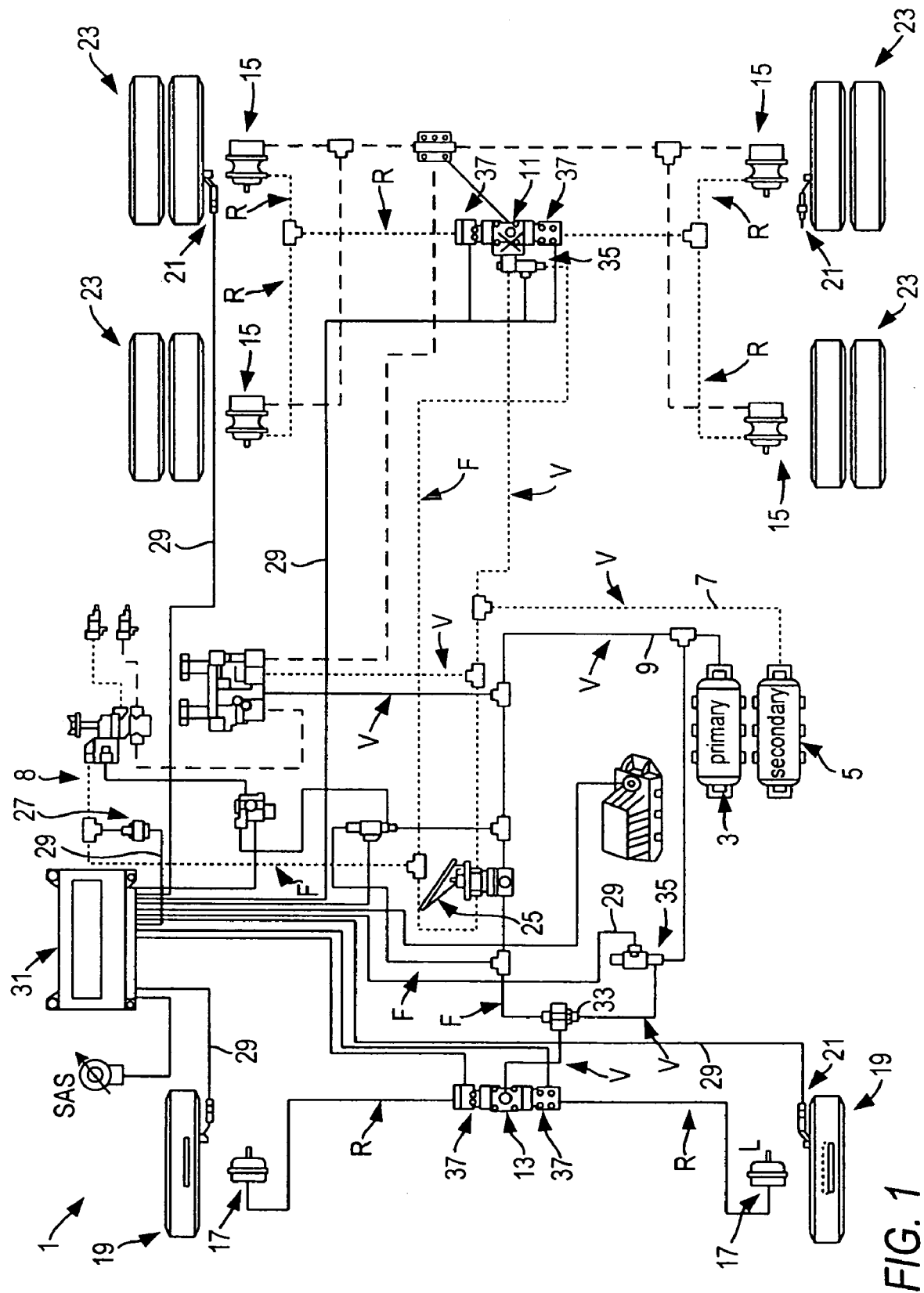
FIG. 1 is a schematic illustration of a braking system according to a preferred embodiment of the invention.

FIG. 1 is a schematic representation of the structure of a vehicle braking system 1 according to a preferred embodiment of the present invention. The braking system 1 has a primary pressure vessel 3 and a secondary pressure vessel 5, which supply pressurized fluid to the braking system 1 by means of pressure lines 7, 9.

The pressurized fluid is fed to, inter alia, a rear axle valve arrangement 11 by activation of the brake valve 25 by the vehicle driver. The rear axle valve arrangement 11 can be controlled and passes on the pressurized fluid to one or more rear axle braking arrangements 15. The pressurized fluid is fed directly to the rear axle valve arrangement 11 by means of the pressure line 7 so that it can pass on to one or more rear axle braking arrangements 15 by means of a 3/2 way valve 35, independently of the activation of the brake valve 25 by the driver. The braking arrangements 15 are constructed and arranged to effect deceleration of the vehicle or deceleration of the rear axle wheels 23.

Furthermore, pressurized fluid is made available, by activation of the brake valve 25 by the driver, to a front axle valve arrangement 13 which is designed to feed pressurized fluid to at least a front axle braking arrangement 17. The pressurized fluid is fed directly to the front axle valve arrangement 13 by means of the pressure line 9 so that it can pass on to the front axle braking arrangement 17 by means of a 3/2 way valve 35 independently of the activation of the brake valve 25 by the driver. The front axle braking arrangement 17 is designed to effect braking of the vehicle or braking of at least one front wheel 19.

In the embodiment of the invention depicted in FIG. 1, both the front wheels 19 and two of the rear wheels 23 have speed sensors 21 to measure the speed of the wheels 19, 23. A pressure sensor 27 is provided for measuring the pressure at the driver's end of the pressure line 8.

The valve arrangements 11, 13, the wheel speed sensors 21 and the pressure sensor 27 are electrically connected to a control unit 31 by means of electrical lines 29. Control unit 31 includes a data processing system (not illustrated) including a data processor which is adapted to receive and process the measurement signals which are output by the sensors 21, 27.

The braking system depicted in FIG. 1 includes various pressure lines under different pressures. The full system pressure is applied to the pressure lines which are identified by the reference label V. This either occurs continuously or when the 3/2 way valves 35 are energized. The system pressure can be, for example, of the order of magnitude of 8 bar. A pressure which is controlled by the driver of the vehicle using the brake pedal 25 is applied to the pressure lines which are identified by reference label F. Furthermore, the electrically controlled pressure, which is predefined by, for example, an active RSC or ACC system, is present in the pressure lines identified by the reference label R.

In an operating state in which no electronic brake control system is active, the pressure which is present in pressure lines F also is present in pressure lines R.

The braking system depicted in FIG. 1 also has a select high valve 33 which feeds through the respective greater of the two pressures present at the valve inputs to the front axle valve arrangement 13. A 3/2 way valve 35 is connected in each case upstream of both the front axle valve arrangement 13 and the rear axle valve arrangement 11 in order to feed the brake pressure to the brake cylinders through ABS valves.

Figure 2:
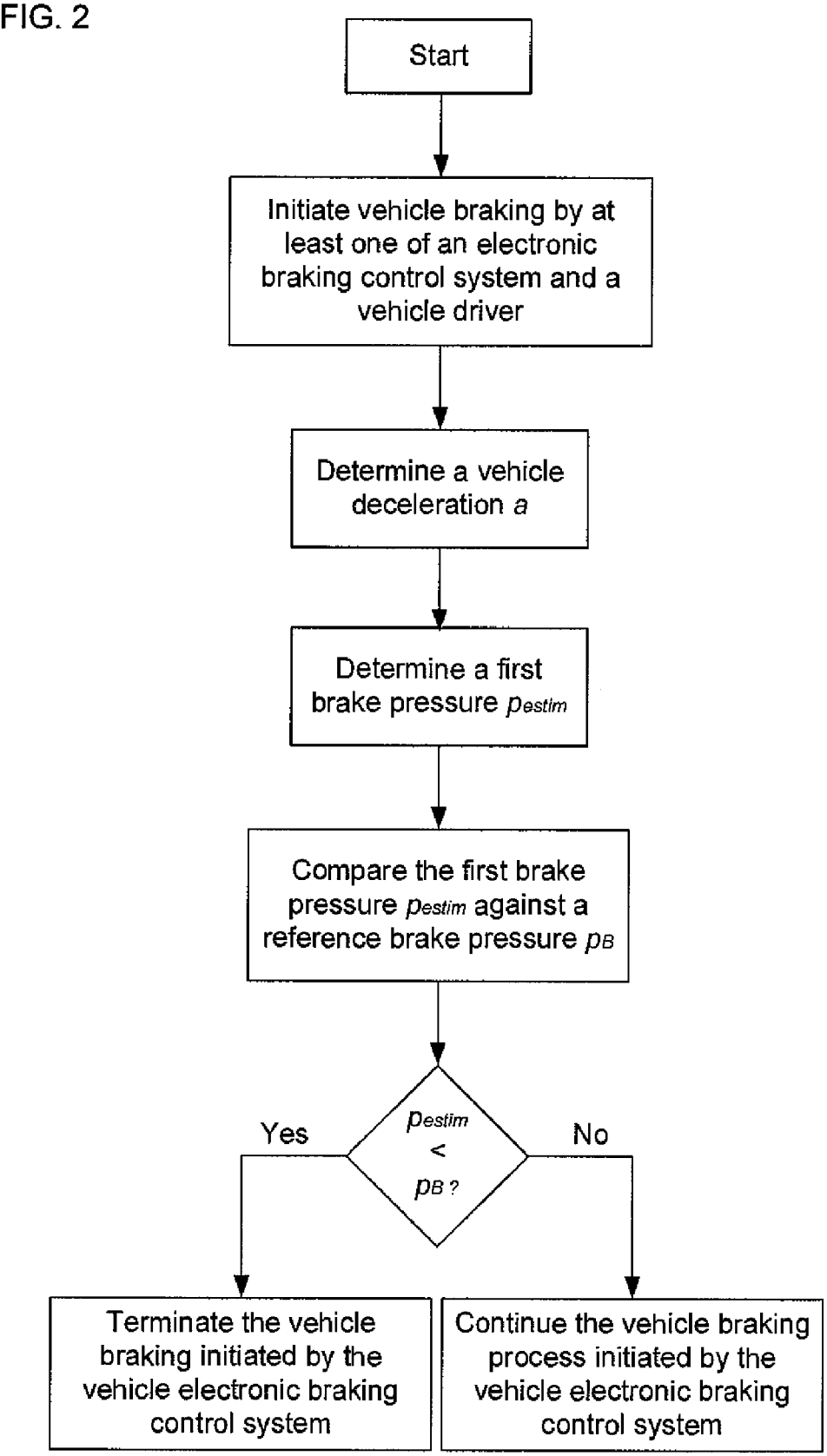
FIG. 2 shows an illustrative process for controlling a braking system according to embodiments of the invention.

As shown in FIG. 2, the method according to a preferred embodiment of the present invention includes the steps of: effecting vehicle braking by the electronic braking system and/or the vehicle driver; determining the vehicle deceleration a; determining the estimated brake pressure that is predefined by the control electronics pestim; comparing the brake pressure pestim against a reference pressure PB; and terminating vehicle braking triggered by the electronic braking system when pestim is less than the reference pressure PB, or continuing vehicle braking triggered by the electronic braking system when pestim is greater than or equal to the reference pressure PB.

The inventive method advantageously leverages the fact that the brake pressure that is predefined by the control electronics does not have to be measured but, instead, can be calculated from other measured variables which are determined in any event within the scope of the operation of the vehicle and are available to a control unit and/or a data processing system. As a result, the costs associated with employing further sensors are avoided. Furthermore, the determination of the brake pressure $p_{estim}$ according to embodiments of the inventive method is sufficiently accurate.

Vehicle braking is triggered by the driver by the activation of the brake pedal. The electronic braking system for controlling automatic braking operates in a largely autonomous fashion and is driven by the control unit. The control unit also effects the comparison of the determined, estimated brake pressure $p_{estim}$ with the reference pressure $p_B$. The reference pressure $p_B$ and the vehicle deceleration a are each determined by suitable known measuring means and made available to the control unit via signal transmission means—in particular, via signal lines or wireless transmission. If the reference pressure $p_B$, which represents the brake pressure requested by the driver is greater than the brake pressure $p_{estim}$ which represents the brake pressure predefined by the electronic braking system, the braking process which is triggered by the electronic braking system is aborted and the brake pressure $p_B$ which is requested by the driver is fed to the braking arrangement. Otherwise, that is, if $p_{estim}$ is greater than or equal to $p_B$, the control process of the electronic braking system is continued without modification to ensure that the braking triggered by the electronic braking system is not aborted in the event that the driver requests less brake pressure than is warranted for the driving situation. This increases operational reliability.

According to an advantageous embodiment of the present invention, the inventive method also includes the steps of: calculating a characteristic variable K (where K is the quotient of brake pressure $p_B$ and vehicle deceleration a); and calculating the brake pressure $p_{estim}$ as the product of the characteristic variable K and vehicle deceleration a (i.e., Ka).

The characteristic variable $K=p_B/a$ can be calculated automatically with minimal computational expenditure and, therefore, minimal programming expenditure. In addition, this calculation can be effected during each braking process in which driver-end brake pressure $p_B$ occurs, and as a result of which vehicle deceleration a of the vehicle occurs.

A further embodiment of the method according to the present invention includes the step of effecting a learning process by means of a data processing system to determine the characteristic variable $K_{Ref}$. The learning process serves the purpose of preventing adverse effects owing to individual "atypical" measured values which could cause an incorrect characteristic variable $K_{Ref}$ to be determined. The learning process ensures that fault-induced deviations of the measured signals of the pressure $p_B$ and of the vehicle deceleration a have the smallest possible influence on $K_{Ref}$.

In accordance with an embodiment of the present invention, the learning process includes the steps of: effecting vehicle braking; determining the characteristic variable K; transferring the characteristic variable K to the data processing system; and forming average values over a plurality of values of K to yield an average characteristic variable $K_{Ref}$.

Characteristic variables K which are stored in the data processing system and from which the characteristic variable $K_{Ref}$ is formed are therefore determined, by means of the learning process, for a plurality of vehicle braking operations. It is advantageous to combine a plurality of values K using average value forming means, and to form the characteristic variable $K_{Ref}$ in this way.

In a further embodiment of the method according to the present invention $p_{estim}$ is calculated as the product of $K_{Ref}$ and a.

In another advantageous embodiment of the method according to the present invention, the vehicle deceleration a is measured by at least one acceleration sensor. Acceleration sensors, e.g., 3D inclination sensors, are frequently installed in vehicles. These sensors can be used without additional installations since the inclination values or acceleration values that they determine are typically transferred to the control unit which then, correspondingly, passes on the deceleration values a for calculation of $p_{estim}$.

In yet another embodiment of the method according to the present invention, the vehicle deceleration a is calculated by determining the change in the rotational speed of at least one vehicle wheel during braking. The calculation of the vehicle deceleration from the derivative of the wheel speed over time is particularly advantageous when the use of acceleration sensors is avoided for technical reasons or for reasons of economy of fabrication.

According to a further embodiment of the method according to the present invention, the change in the rotational speed of a non-driven wheel is determined in order to calculate the vehicle deceleration a. Since the driven wheels of a vehicle are always subject to a certain degree of slip when the vehicle is accelerated or decelerated, it is advantageous to calculate the vehicle deceleration by means of the change in speed of a non-driven wheel. This reliably prevents the vehicle deceleration a from being incorrectly affected by drive influences.

In a still further embodiment, the brake pressure $p_B$ is measured by means of at least one pressure sensor. Pressure sensors for determining the brake pressure $p_B$ at the driver's end are installed in any case in most vehicles, so, use of such a sensor does not require any additional installation work.

According to yet a further embodiment of the method of the present invention, the characteristic variable K is transferred to the data processing system either by means of electrical lines or in a wireless fashion. The type of data transmission depends on the respective installation situation of the data processing system and/or of the components of the vehicle braking system. The transfer of data in a wireless fashion is particularly advantageous when wiring the component involves a large amount of effort. The transfer of data by means of electrical lines can, on the other hand, be advantageous if particularly reliable transmission of data is important. The influence of interference radiation on electrical lines is less of an issue in this case and can also be reduced further by suitable shielding measures.

The method according to embodiments of the present invention will be discussed hereinafter by way of a representative example and with reference to FIG. 1.

Example

An ACC control system is activated in a driving situation in which a vehicle equipped with a braking system according to an embodiment of the present invention approaches, too closely, another vehicle traveling ahead. Pressure is applied to the 3/2 way valves 35, and the brake pressure is fed to the brake cylinders through the ABS valves 37. If the full system pressure is not to be applied to the brake cylinders, the ABS valves 37 are actuated electrically after a specific activation time, predefined by the control unit 31, and shut off the passage of fluid. This causes the instantaneous pressure at the brake cylinders to be held. In this example, it is assumed that a pressure of 8 bar is present in pressure lines V, a pressure of 2 bar is present in lines R, and a pressure of 0 bar is present in lines F.

When the driver brakes manually, in addition to the automatic braking process, by depressing the brake pedal 25, a pressure is generated in pressure lines F. The brake pressure $p_B$ at the driver's end is measured, and the control unit 31 and the integrated data processing system determine whether the brake pressure $p_B$ that is demanded by the driver and is present in pressure lines F is greater than the pressure that is predefined by the electronic braking system and is present in pressure lines R. If it is, the electronic controller is switched off and the relatively high brake pressure demanded by the driver is passed to the brake cylinders.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for determining a brake pressure predefined by a vehicle electronic braking control system, comprising the steps of:
   initiating vehicle braking by at least one of said electronic braking control system and a vehicle driver;
   determining a vehicle deceleration;
   determining a first brake pressure;
   comparing said first brake pressure against a reference brake pressure;
   terminating said vehicle braking initiated by said vehicle electronic braking control system when said first brake pressure is less than said reference brake pressure; and
   continuing said vehicle braking initiated by said vehicle electronic braking control system when said first brake pressure is at least one of greater than and equal to said reference brake pressure.

2. The method according to claim 1, further comprising the step of effecting a learning process using a data processing system to determine a first characteristic variable.

3. The method according to claim 1, wherein said first brake pressure is a product of a first characteristic variable and said vehicle deceleration.

4. The method according to claim 1, wherein said vehicle deceleration is measured by at least one acceleration sensor.

5. The method according to claim 1, wherein said vehicle deceleration is calculated by determining a change in speed of at least one vehicle wheel during vehicle braking.

6. The method according to claim 5, wherein said vehicle deceleration is calculated based on a change in rotational speed of a non-driven one of said at least one vehicle wheel.

7. The method according to claim 1, wherein said reference brake pressure is measured by at least one pressure sensor.

8. A method for determining a brake pressure predefined by a vehicle electronic braking control system, comprising the steps of
   initiating vehicle braking by at least one of said electronic braking control system and a vehicle driver;
   determining a vehicle deceleration;
   calculating a first characteristic variable, wherein said first characteristic variable is a quotient of a reference brake pressure and said vehicle deceleration;
   calculating a first brake pressure based on said first characteristic variable,
   comparing said first brake pressure against said reference brake pressure;
   terminating said vehicle braking initiated by said vehicle electronic braking control system when said first brake pressure is less than said reference brake pressure; and
   continuing said vehicle braking initiated by said vehicle electronic braking control system when said first brake pressure is at least one of greater than and equal to said reference brake pressure.

9. A method for determining a brake pressure predefined by a vehicle electronic braking control system, comprising the steps of:
   initiating vehicle braking by at least one of said electronic braking control system and a vehicle driver;
   determining a vehicle deceleration;
   determining a first brake pressure;
   comparing said first brake pressure against a reference brake pressure;
   terminating said vehicle braking initiated by said vehicle electronic braking control system when said first brake pressure is less than said reference brake pressure;
   continuing said vehicle braking initiated by said vehicle electronic braking control system when said first brake pressure is at least one of greater than and equal to said reference brake pressure;
   determining a second characteristic variable, wherein said second characteristic variable is a quotient of said reference brake pressure and said vehicle deceleration; and
   using the data processing system, forming average values over a plurality of values of said second characteristic variable to determine a first characteristic variable.

10. The method according to claim 9, wherein said first characteristic variable is transferred to said data processing system at least one of via electrical lines and wirelessly.

11. A vehicle braking system for acquiring a brake pressure predefined by a vehicle electronic braking control system, said vehicle braking system comprising:
   a braking arrangement configured to brake at least one vehicle wheel, said braking arrangement comprising at least one pressure line for supplying a pressurized fluid to said braking arrangement;
   a pressure measuring apparatus for determining a reference brake pressure present in said braking arrangement;
   a speed measuring apparatus for determining at least one of wheel speed and vehicle deceleration;
   a data processing system for acquiring a first brake pressure predefined by said vehicle electronic braking control system; and
   a data memory for storing and generating data, wherein said data processing system is adapted to compare said first brake pressure with said reference brake pressure, and terminate braking by said vehicle electronic braking control system when said first brake pressure is less than said reference brake pressure.

12. The vehicle braking system according to claim 11, wherein said data processing system is integrated into a control unit adapted to control automatic vehicle braking processes.

13. The vehicle braking system according to claim 11, wherein said data processing system is adapted to at least one of store in a data memory and output from said data memory values for at least one of a first characteristic variable and a second characteristic variable.

14. A vehicle, comprising a chassis, at least one driven wheel axle, a vehicle body, an area for accommodating vehicle occupants, a trailer hitch for connection to a vehicle trailer, and a vehicle braking system according to claim 11.

15. A truck, comprising a vehicle braking system according to claim 11.

16. A computer program product comprising a non-transitory computer usable physical medium storing a computer readable program code for causing an application program to execute on a computer to control a vehicle braking system according to claim 11.

* * * * *